United States Patent
Sugimoto et al.

(10) Patent No.: US 12,530,904 B2
(45) Date of Patent: Jan. 20, 2026

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventors: Kousei Sugimoto, Kanagawa (JP); Masatsugu Nakano, Tochigi (JP); Makoto Takahashi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 18/496,062

(22) Filed: Oct. 27, 2023

(65) Prior Publication Data

US 2024/0177492 A1 May 30, 2024

(30) Foreign Application Priority Data

Nov. 30, 2022 (JP) .................... 2022-191271

(51) Int. Cl.
  *G06V 20/56* (2022.01)
  *G06F 3/14* (2006.01)
  *G06T 11/00* (2006.01)

(52) U.S. Cl.
  CPC ........... *G06V 20/56* (2022.01); *G06F 3/14* (2013.01); *G06T 11/00* (2013.01)

(58) Field of Classification Search
  CPC ............ G06V 20/56; G06F 3/14; G06T 11/00
  USPC ........................................................ 348/148
  See application file for complete search history.

(56) References Cited

U.S. PATENT DOCUMENTS

| 11,159,744 | B2 | 10/2021 | Aihara |  |
|---|---|---|---|---|
| 2008/0136912 | A1* | 6/2008 | Iwano | G06T 1/0007 348/148 |
| 2012/0050528 | A1* | 3/2012 | Davies | G01C 11/02 348/136 |
| 2015/0264259 | A1* | 9/2015 | Raghoebardajal | G06T 3/12 348/36 |
| 2018/0086271 | A1* | 3/2018 | Kosugi | H04N 5/44504 |

(Continued)

FOREIGN PATENT DOCUMENTS

| JP | 2004-345554 A | 12/2004 |
|---|---|---|
| JP | 2007-008197 A | 1/2007 |
| JP | 2010-095202 A | 4/2010 |

(Continued)

OTHER PUBLICATIONS

Jul. 23, 2024 Japanese Official Action in Japanese Patent Appln. No. 2022-191271.

(Continued)

*Primary Examiner* — Joseph G Ustaris
*Assistant Examiner* — Jimmy S Lee
(74) *Attorney, Agent, or Firm* — Venable LLP

(57) ABSTRACT

An image processing system includes an imaging unit configured to include an optical system that forms an optical image having a low distortion region and a high distortion region, to be able to capture an image of at least an outer rear side of a movable apparatus in the low distortion region, and to be disposed such that an inside of the movable apparatus is included in an angle of view of the optical system, and a display unit configured to display image signals of the inside and outside of the movable apparatus which are generated by the imaging unit.

12 Claims, 9 Drawing Sheets

(56) References Cited

U.S. PATENT DOCUMENTS

2018/0160052 A1    6/2018  Aihara
2019/0266423 A1*   8/2019  Akiba ..................... G06T 7/74

FOREIGN PATENT DOCUMENTS

JP    2012-156672 A    8/2012
JP    2020-164067 A    10/2020
WO    2018/016305 A1   1/2018

OTHER PUBLICATIONS

May 2, 2024 European Official Action in European Patent Appln. No. 23207622.4.

* cited by examiner

IMAGE PROCESSING SYSTEM, IMAGE PROCESSING METHOD, AND STORAGE MEDIUM

BACKGROUND OF THE INVENTION

Field of the Invention

The present invention relates to an image processing system, an image processing method, and a storage medium.

Description of the Related Art

In recent years, there has been a demand for replacing a rear view mirror mounted on a vehicle with an electronic rear view mirror. Japanese Patent Application Laid-Open No. 2010-95202 discloses an electronic rear view mirror system that is constituted by an imaging unit in which the rear outside the vehicle is set as an imaging range, and a display unit inside the vehicle. In the electronic rear view mirror system, an image captured by the imaging unit is displayed on a display inside the vehicle so that a driver can confirm the state of the rear outside the vehicle.

On the other hand, there is a rear side confirmation system that allows a driver to confirm a rear spot behind a vehicle when the vehicle is backing up. Japanese Patent Application Laid-Open No. 2004-345554 discloses a rear side confirmation system in which a camera is installed to image a rear view from a vehicle, and a captured image is displayed inside the vehicle so that a driver can confirm a rear spot behind the vehicle when the vehicle is backing up.

The camera serving as the imaging unit that captures the above-mentioned image for the electronic rear view mirror is required to have high resolution so that the driver can check the relatively distant situation behind the vehicle in more detail. On the other hand, rear confirmation camera systems are required to capture images of a wider area in order to confirm safety in a wider area, including the blind spots behind the vehicle and the rear sides, in order to avoid collisions when reversing.

Additionally, when an electronic rear view mirror system and a rear confirmation system are installed in a vehicle at the same time, the in-vehicle image processing system becomes complicated if the camera for the electronic rear view mirror system and the camera for the rear confirmation system are installed separately. Such a problem similarly occurs, for example, in an automatic driving system in which a plurality of cameras are arranged to photograph the surrounding situation of a vehicle to perform automatic driving.

On the other hand, the number of cameras installed in a vehicle can be reduced by, for example, adopting a camera that uses a special ultra-wide-angle lens. However, when an ultra-wide-angle lens or the like is used, a wide angle of view can be obtained, but distortion in a peripheral portion is large, and it is difficult to recognize objects in the peripheral portion unless distortion correction is performed. On the other hand, when a screen is displayed after distortion correction, a delay time is required, which may cause a delay in image recognition or visual recognition of obstacles and the like, resulting in danger.

SUMMARY OF THE INVENTION

An image processing system according to one aspect of the present invention includes an imaging unit configured to include an optical system that forms an optical image having a low distortion region and a high distortion region, to be able to capture an image of at least an outer rear side of a movable apparatus in the low distortion region, and to be disposed such that an inside of the movable apparatus is included in an angle of view of the optical system, and at least one processor or circuit configured to function as a display unit configured to display image signals of the inside and outside of the movable apparatus which are generated by the imaging unit.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

First Embodiment

In a first embodiment, an improved method for achieving both display for a high-definition electronic rear view mirror and display for confirming a vehicle's surroundings such as a wide range of a rear side by using a small number of cameras will be described.

Figure 1:
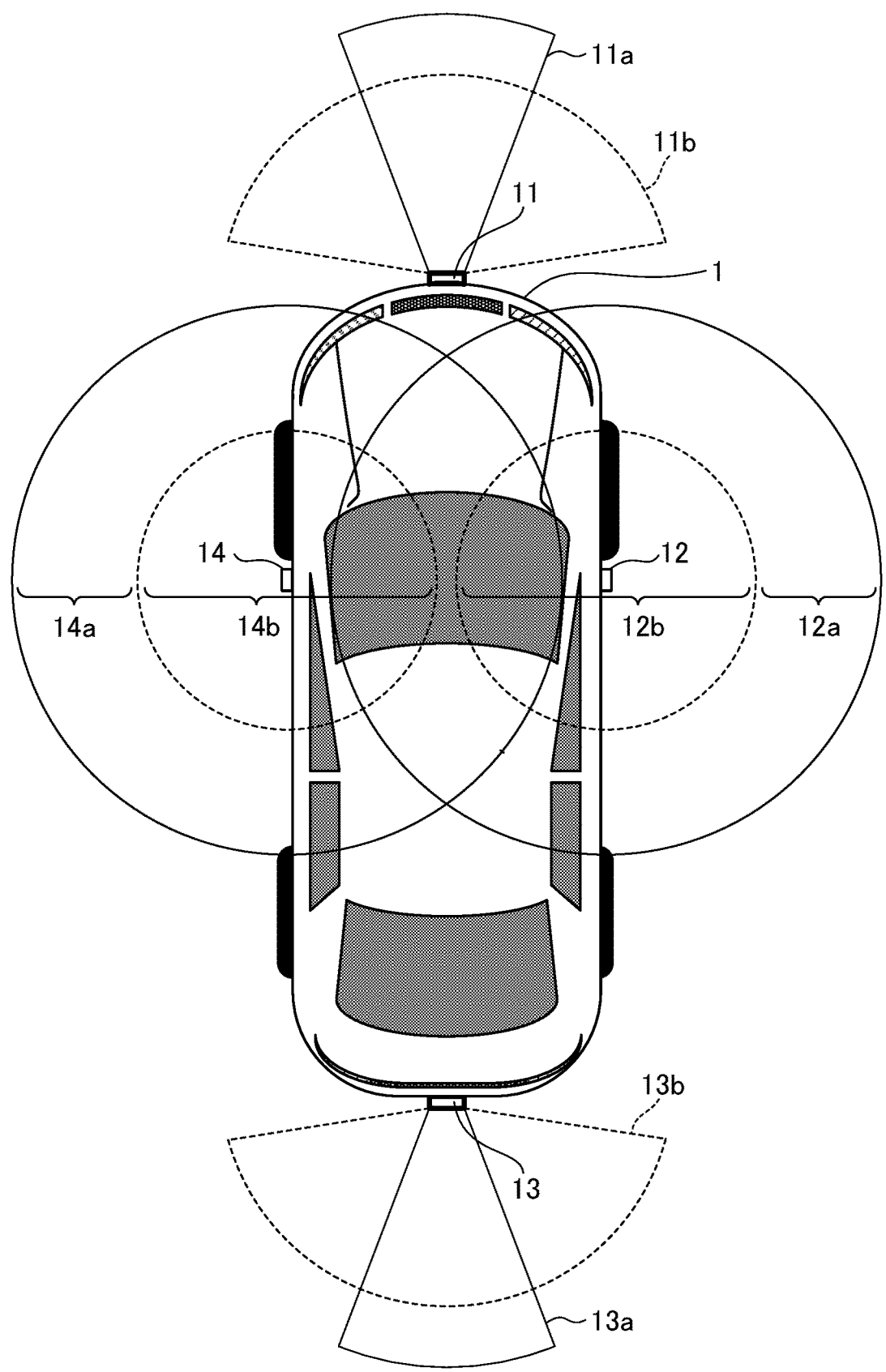
FIG. 1 is an overhead view illustrating a positional relationship between a vehicle and an imaging unit in an image processing system according to a first embodiment.
Figure 2:
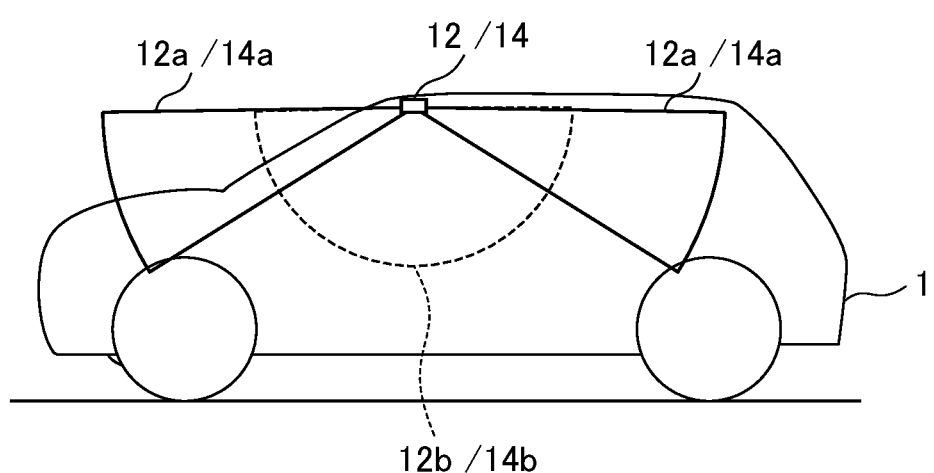
FIG. 2 is a side view illustrating a positional relationship between the vehicle and the imaging unit of a camera unit 14 in the image processing system according to the first embodiment.

FIG. 1 is an overhead view illustrating a positional relationship between a vehicle and an imaging unit in an image processing system according to a first embodiment. FIG. 2 is a side view illustrating a positional relationship between the vehicle and the imaging unit of a camera unit 14 in the image processing system according to the first embodiment.

In the first embodiment, as illustrated in FIG. 1, camera units 11, 12, 13, and 14 are installed at the front, right side, rear, and left side of a vehicle 1, for example, an automobile, which is a movable apparatus. Although four camera units are provided in the first embodiment, the number of camera units is not limited to four, and it is sufficient that at least one or more camera units are provided.

As illustrated in FIG. 1, the camera units 11 to 14 are installed such that the respective imaging angles of view thereof have imaging ranges of the front, right side, left side, and rear of the vehicle 1 which is a movable apparatus. The camera units 11 and 13 have substantially the same configuration, and each include an imaging element that captures an optical image and an optical system that forms an optical image on a light receiving surface of the imaging element.

On the other hand, the optical systems of the camera units 12 and 14 are configured to be able to capture images at angles of view that allow monitoring of the interior of the vehicle, which is the interior of the movable apparatus. The camera units 12 and 14 are capable of capturing an image of at least the outer rear side of the movable apparatus in a low distortion region.

For example, the camera units 11 and 13 are installed such that the optical axes of the optical systems of the camera units 11 and 13 are substantially horizontal when the movable apparatus is horizontal. The camera units 12 and 14 are respectively disposed outside right and left doors as illustrated in FIG. 2, and the respective optical axes are disposed in a vertical direction (below substantially perpendicular to the ground) when viewed from the side surface of the vehicle 1.

Thus, the camera units 12 and 14 each have an angle of view of approximately 360 degrees, and are capable of imaging an obliquely front lower side, a lateral side, an obliquely rear side, and the inside of the vehicle 1. Although the camera unit 14 is illustrated in FIG. 2, the camera unit 12 is also disposed in the same manner on the right side of the vehicle, and thus the numbering of the camera units 12 is also shown in parallel.

Furthermore, the optical systems included in the camera units 11 and 13 used in the first embodiment are configured to be able to obtain high-definition images at angles of view around the optical axes and to obtain captured images with low resolution at the surrounding angles of view away from the optical axes.

On the other hand, the optical systems of the camera units 12 and 14 are configured to be able to obtain low-resolution (high distortion) images at angles of view around the optical axes and to obtain captured images with high resolution (low distortion) at the surrounding angles of view away from the optical axes.

Imaging angles of view 12a and 14a in which images can be captured with high resolution and low distortion are set such that the rear seats in the vehicle can be imaged. Reference numerals 11a to 14a denote imaging angles of view in which images can be captured with high resolution and low distortion, and reference numerals 11b to 14b denote maximum imaging ranges of the camera units 11 to 14, respectively.

The optical systems included in the camera units 11 and 13 in the first embodiment will be described using FIG. 3. Characteristics of the optical systems of the camera units 11 and 13 do not need to be the same, but in the first embodiment, it is assumed that the optical systems of the camera units 11 and 13 have substantially the same characteristics, and an example of the optical system included in the camera unit 11 will be described.

FIGS. 3A and 3B are diagrams illustrating optical characteristics of the imaging unit of the camera unit 11 in the first embodiment of the present invention. FIG. 3A is a diagram illustrating an image height y of the optical system included in the camera unit 11 in the first embodiment at each half angle of view on a light receiving surface of the imaging element in a contour line pattern.

FIG. 3B is a diagram illustrating projection characteristics representing a relationship between an image height y and a half angle of view $\theta$ of the optical system of the camera unit 11 in the first embodiment. In FIG. 3B, a half angle of view (an angle formed by an optical axis and an incident light beam) $\theta$ is shown as a horizontal axis, and an imaging height (image height) y on the sensor surface (image plane) of the camera unit 11 is shown as a vertical axis.

As illustrated in FIG. 3B, the optical system of the camera unit 11 in the first embodiment is configured to have different projection characteristics $y(\theta)$ between a region of less than a predetermined half angle of view Oa and a region of equal to or greater than the half angle of view $\theta a$. Thus, when the amount of increase in the image height y with respect to the half angle of view $\theta$ per unit is assumed to be a resolution, the resolution differs depending on a region.

It can also be said that this local resolution is represented by a differential value $dy(\theta)/d\theta$ of a projection characteristic $y(\theta)$ at a half angle of view $\theta$. That is, it can be said that the larger an inclination of the projection characteristic $y(\theta)$ in FIG. 3B, the higher the resolution. Further, it can be said that the larger an interval between image heights y at the respective half angles of view of the contour line patterns in FIG. 3A, the higher the resolution.

In the first embodiment, a central region formed on the sensor surface when the half angle of view $\theta$ is less than the predetermined half angle of view $\theta a$ is referred to as a high resolution region 10a, and an outer region in which the half angle of view $\theta$ is equal to or greater than the predetermined half angle of view $\theta a$ is referred to as a low resolution region 10b. The high resolution region 10a corresponds to an imaging angle of view 11a, and a combination of the high resolution region 10a and the low resolution region 10b corresponds to an imaging angle of view 11b.

In the first embodiment, a circle at a boundary between the high resolution region 10a and the low resolution region 10b is referred to as a resolution boundary, and a boundary image on a display screen corresponding to the resolution boundary is referred to as a display resolution boundary or simply a boundary image. The boundary image displayed on the display screen (display resolution boundary) may not have a circular shape. The boundary image may have an oval shape or another shape.

In the first embodiment, the high resolution region 10a is a low distortion region with relatively little distortion, and the low resolution region 10b is a high distortion region with relatively much distortion.

Thus, in the first embodiment, the high resolution region and the low resolution region correspond to a low distortion region and a high distortion region, respectively, and the high resolution region and the low resolution region may be referred to as a low distortion region and a high distortion region, respectively. In contrast, the low distortion region and the high distortion region may be referred to as a high resolution region and a low resolution region, respectively.

The optical system included in the camera unit 11 in the first embodiment is configured such that its projection characteristic y(θ) is larger than f×θ in the high resolution region (low distortion region) 10a (f is a focal length of the optical system included in the camera unit 11). Furthermore, the projection characteristic y(θ) in the high resolution region (low distortion region) is set to be different from the projection characteristic in the low resolution region (high distortion region).

Further, when θ max is a maximum half angle of view of the optical system included in the camera unit 11, it is preferable that a ratio θa/θ max between θa and θ max be equal to or larger than a predetermined lower limit, and for example, the predetermined lower limit is preferably 0.15 to 0.16.

Furthermore, it is preferable that the ratio θa/θ max between θa and θ max be equal to or less than a predetermined upper limit, and be, for example, 0.25 to 0.35. For example, when θ max is set to 90°, the predetermined lower limit is set to 0.15, and the predetermined upper limit is set to 0.35, it is preferable that θa be determined in the range of 13.5° to 31.5°.

Further, the optical system included in the camera unit 11 is configured such that its projection characteristic y(θ) satisfies the following Formula 1.

$$1 < f \times \sin\theta \max / y(\theta \max) \leq A \quad \text{(Formula 1)}$$

As described above, f is a focal length of the optical system included in the camera unit 11, and A is a predetermined constant. A center resolution can be set to be higher than that of a fisheye lens of an orthogonal projection system (y=f×sin θ) having the same maximum imaging height by setting a lower limit to 1, and it is possible to maintain good optical performance while obtaining an angle of view equivalent to that of the fisheye lens by setting an upper limit to A.

The predetermined constant A may be determined in consideration of a balance between the resolutions of the high resolution region and the low resolution region, and is preferably set to 1.4 to 1.9.

By configuring the optical system as described above, a high resolution can be obtained in the high resolution region 10a, while in the low resolution region 10b, the amount of increase in an image height y with respect to a half angle of view θ per unit is reduced, and an image can be captured at a wider angle of view. Thus, a high resolution can be obtained in the high resolution region 10a while setting a wide angle of view equivalent to that of a fisheye lens as an imaging range.

Furthermore, in the first embodiment, in a high resolution region (low distortion region), projection characteristics approximate to a central projection system (y=f×tan θ) and an equidistant projection system (y=f×θ), which are projection characteristics of a normal imaging optical system, are used, and thus an optical distortion is small and fine display is possible.

Thus, it is possible to obtain a natural sense of perspective when viewing surrounding vehicles such as a preceding vehicle and a following vehicle and to obtain good visibility by suppressing deterioration of image quality.

Figure 3:
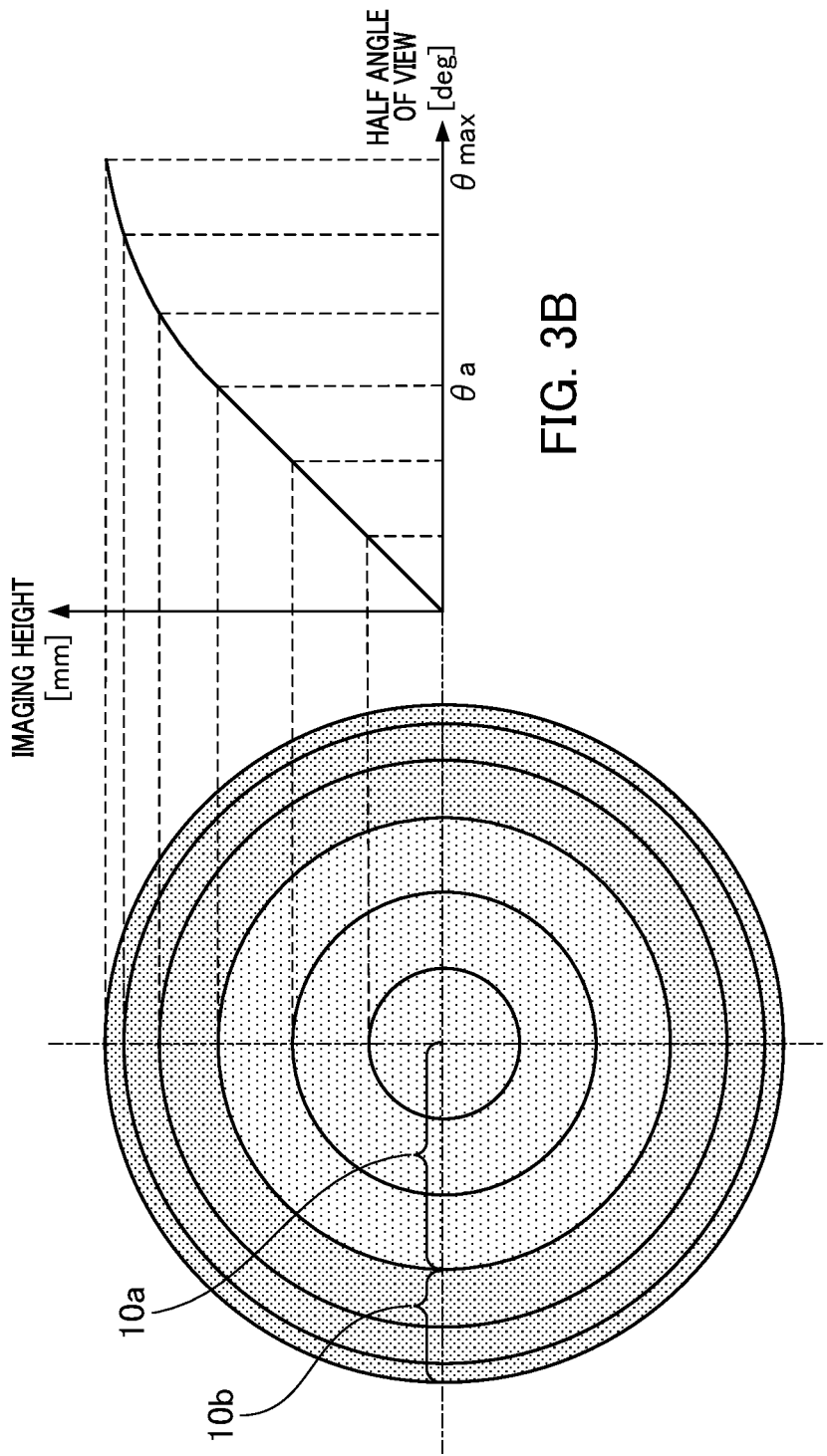
FIGS. 3A and 3B are diagrams illustrating optical characteristics of the imaging unit of the camera unit 11 according to the first embodiment.

The first embodiment is not limited to the projection characteristics illustrated in FIG. 3 because the same effects can be obtained as long as a projection characteristic y(θ) satisfies the condition of Formula 1 described above. In the first embodiment, an optical system having a projection characteristic y(θ) that satisfies the condition of Formula 1 described above may be referred to as a different angle-of-view lens.

In the first embodiment, an optical system having a projection characteristic y(θ) that satisfies the condition of the following Formula 2 is used for the camera units 12 and 14, instead of using the different angle-of-view lens as shown in FIG. 3 and Formula 1. In this optical system, a relationship between a high resolution region and a low resolution region is substantially opposite to that of the different angle-of-view lens described above.

That is, in the above-described different angle-of-view lens, a central region is the high resolution region 10a, and an outer region in which a half angle of view θ is equal to or greater than the predetermined half angle of view θa is the low resolution region 10b.

However, in an optical system that satisfies the condition of Formula 2, a central region is the low resolution region 10b, and an outer region in which a half angle of view θ is equal to or greater than the predetermined half angle of view θa is the high resolution region 10a. Such an optical system may be referred to as a reverse different angle-of-view lens.

$$0.2 < 2 \times f \times \tan(\theta \max/2)/y(\theta \max) < 0.92 \quad \text{(Formula 2)}$$

In this manner, at least one of the camera units satisfies Formula 2 described above when a focal length of its optical system is f, a half angle of view is θ, an image height on an image plane is y, a projection characteristic representing a relationship between the image height y and the half angle of view θ is y(θ), and θ max is a maximum half-angle of view of the optical system.

In the first embodiment, the camera unit having the different angle-of-view lens described above is used to capture images of the front and rear of a movable apparatus, whereas a camera unit having a reverse different angle-of-view lens is used to capture an image of the side of the movable apparatus. This is because there is a high possibility that a subject to be watched during the running of the movable apparatus will be shown at the front and rear of the side of the movable apparatus.

Figure 4:
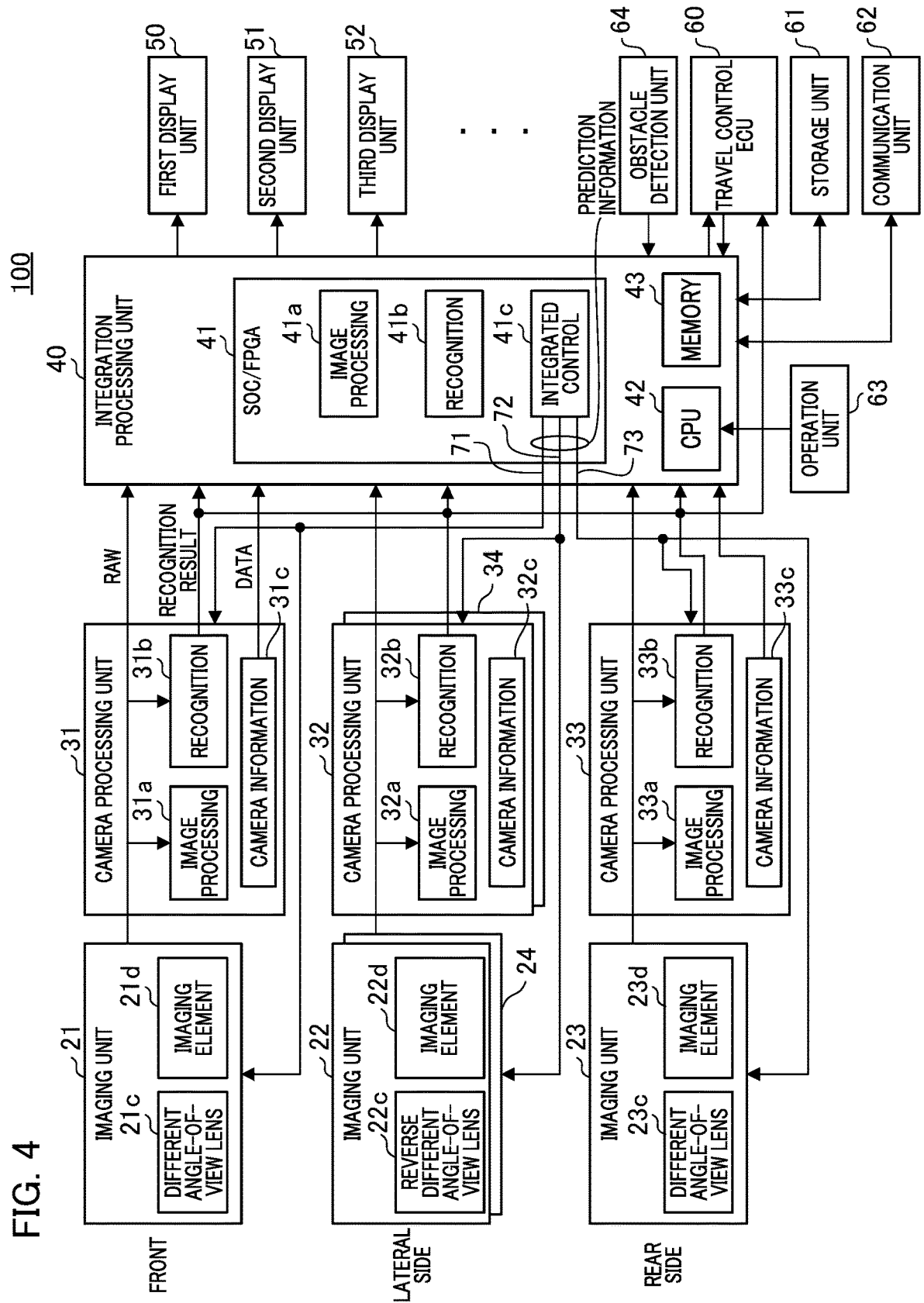
FIG. 4 is a functional block diagram illustrating the configuration of an image processing system in the first embodiment.

Next, a configuration of the image processing system in the first embodiment will be described using FIG. 4. FIG. 4 is a functional block diagram illustrating a configuration of the image processing system in the first embodiment.

Some of functional blocks illustrated in FIG. 4 are realized by causing a CPU or the like as a computer included in the image processing system to execute a computer program stored in a memory as a storage medium.

However, some or all of them may be realized by hardware. As the hardware, a dedicated circuit (ASIC), a processor (reconfigurable processor, DSP), or the like can be used. Further, the respective functional blocks illustrated in FIG. 4 do not need to be built into the same housing, and may be constituted by separate devices connected to each other via signal paths.

In FIG. 4, the image processing system 100 is mounted on the vehicle 1 as a movable apparatus, and imaging units 21 to 24 and camera processing units 31 to 34 are disposed inside the housings of the camera units 11 to 14, respectively.

The imaging units 21 and 23 respectively include different angle-of-view lenses 21c and 23c and imaging elements 21d and 23d such as CMOS imaging elements and CCD imaging elements. The imaging units 22 and 24 each include reverse different angle-of-view lenses 22c and 24c and imaging elements 22d and 24d such as a CMOS imaging elements or CCD imaging elements. The imaging elements 21d, 22d, 23d, and 24d function as imaging units.

In this manner, the imaging units 21 to 24 each function as imaging units (image acquisition units), and each of the imaging units (image acquisition units) includes an optical system that forms an optical image having a low distortion region and a high distortion region and acquires an image signal generated by the imaging unit. That is, the imaging units perform an imaging step (image acquisition step). In the first embodiment, image acquisition units as a plurality of imaging units disposed at different positions are provided.

The different angle-of-view lenses 21c and 23c as optical systems are constituted by one or more optical lenses, have projection characteristics y(θ) that satisfy the condition of Formula 1, and form optical images having a low distortion region and a high distortion region on light receiving surfaces of the imaging elements 21d and 23d, respectively.

The reverse different angle-of-view lenses 22c and 24c as optical systems are constituted by one or more optical lenses, have projection characteristics y(θ) that satisfy the condition of Formula 2, and form optical images having a low distortion region and a high distortion region on light receiving surfaces of the imaging elements 22d and 24d, respectively.

The imaging elements 21d to 24d photoelectrically convert the optical images and output image signals. For example, RGB color filters are arranged for each pixel on the light receiving surfaces of the imaging elements 21d to 24d. The RGB array is, for example, a Bayer array.

Thus, for example, R, G, R, and G signals are sequentially output from a predetermined row in accordance with the Bayer array from the imaging element, and G, B, G, and B signals are sequentially output from an adjacent row.

Reference numerals 31 to 34 denote camera processing units which are accommodated in the same housings of the camera units 11 to 14 together with the imaging units 21 to 24, respectively, and process imaging signals output from the imaging units 21 to 24, respectively. In FIG. 4, details of the imaging unit 24 and the camera processing unit 34 and wirings thereof are omitted for the sake of convenience.

The camera processing units 31 to 34 include image processing units 31a to 34a, recognition units 31b to 34b, and camera information units 31c to 34c, respectively. The image processing units 31a to 34a perform image processing on imaging signals output from the imaging units 21 to 24, respectively. A portion or the entirety of the function of the camera processing unit 31 may be performed by signal processing units laminated in the imaging elements 21d to 24d.

Specifically, the image processing units 31a to 34a perform white balance adjustment on image data input from the imaging units 21 to 24 in accordance with a Bayer array, perform demosaic processing, and convert the image data into image data in an RGB raster format. Furthermore, a variety of correction processing operations such as gain adjustment, local tone mapping, gamma processing, color matrix processing, and reversible compression processing are performed. However, irreversible compression processing is not performed, and a so-called RAW image signal is formed.

Each of the recognition units 31b to 34b (first image recognition units) performs image recognition of a predetermined object (for example, an automobile, a person, an obstacle, or the like) from an undistorted RAW image signal having been subjected to image processing by each of the image processing units 31a to 34a. That is, each of the recognition units 31b to 34b performs image recognition on an image signal corresponding to a low distortion region in the state of the RAW image signal without performing distortion correction, and outputs a first image recognition result.

Each of the recognition units 31b to 34b according to the first embodiment performs image recognition processing on an RAW image signal obtained from at least the high resolution region 10a, and recognizes a predetermined target object. In this case, each of the recognition units 31b to 34b may also perform image recognition processing on the RAW image signal obtained from the low resolution region 10b. However, since the RAW image signal has not been subjected to distortion correction, an image of a peripheral portion of the different angle-of-view lens is greatly distorted, and the reliability of recognition is reduced.

Alternatively, the recognition units 31b to 34b may cut out the RAW image signal obtained from the high resolution region 10a and perform image recognition processing only on the RAW image signal obtained from the high resolution region 10a.

In this case, it is desirable that a region that is cut out for image recognition have a rectangular shape, which is a shape suitable for image recognition processing. Further, the rectangular region to be cut out may be only a part of the high resolution region 10a (for example, a rectangle inscribed in the high resolution region 10a), or may be a rectangle that includes both the high resolution region 10a and the low resolution region 10b.

Here, the recognition units 31b to 34b function as first image recognition units that perform image recognition based on image signals in at least a partial region among the image signals acquired by the imaging units (image acquisition units) and output first image recognition results. In the first embodiment, the partial region is a region corresponding to a low distortion region.

The recognition units 31b to 34b transmit a set of the type and coordinates of an object to an integration processing unit 40 as a recognition result. Outputs of the recognition units 31b to 34b of the camera units 11 to 14 are also directly supplied to a travel control unit (ECU) 60. This is because it may be necessary to immediately stop traveling based on a recognition result of an obstacle or the like by the recognition unit or to control traveling so as to avoid an obstacle.

The camera information units 31c to 34c (characteristic information holding units) respectively hold camera information of the camera units 11 to 14 in memories in advance. The camera information units can also temporarily hold information from various sensors provided in the camera units 11 to 14.

The camera information includes, for example, characteristic information (resolution boundary information and the like) of an optical image formed by the different angle-of-view lenses 21c and 23c and the reverse different angle-of-view lenses 22c and 24c. The camera information also includes the number of pixels of the imaging elements 21d to 24d, information on mounting position coordinates in vehicle coordinates and postures (pitch, roll, yaw, and the like) of the camera units, an imaging direction, and the like. The camera information may include information such as gamma characteristics, sensitivity characteristics, and a frame rate.

Furthermore, the camera information may include information on an image processing method and an image format when RAW image signals are generated in the image processing units 31a to 34a. The mounting position coordinates may be stored in the memory in the camera information unit in advance because a mounting position for a vehicle is determined for each camera unit in many cases.

The posture coordinates of the camera unit are coordinates relative to the vehicle 1, and may be acquired from an encoder, which is not illustrated in the drawing, provided in the camera unit. Alternatively, the posture coordinates may be acquired using a three-dimensional acceleration sensor or the like.

The information on the imaging direction may be acquired using, for example, a geomagnetic sensor. Since the resolution boundary information of the camera is determined by a lens design, it is assumed that the resolution boundary information is stored in advance in the memory within the camera information unit.

The camera information is pieces of information that are specific to the imaging units 21 to 24 and different from each other. The camera information is transmitted to the integration processing unit 40 and referred to when the integration processing unit 40 performs image processing or the like. Here, the camera information units 31c to 34c function as characteristic information holding units that hold characteristic information on characteristics of optical images.

The camera processing units 31 to 34 include built-in memories that store a CPU as a computer and a computer program as a storage medium. The CPU is configured to control each unit in the camera processing units 31 to 34 by executing the computer program in the memory.

In the first embodiment, the image processing units 31a to 34a and the recognition units 31b to 34b use hardware such as dedicated circuits (ASIC) and processors (reconfigurable processors, DSPs). Thereby, it is possible to realize high-speed image recognition in a high resolution region and increase the possibility of avoiding accidents. The image processing units 31a to 34a may have a distortion correction function.

Some or all of the internal functional blocks of the camera processing units 31 to 34 may be realized by causing the CPU to execute a computer program stored in the memory, but in this case, it is desirable to increase the processing speed of the CPU.

Reference numeral 40 denotes an integration processing unit, which includes a system on chip (SOC)/field programmable gate array (FPGA) 41, a CPU 42 as a computer, and a memory 43 as a storage medium.

The CPU 42 performs a variety of controls of the entire image processing system 100 by executing computer programs stored in the memory 43. In the first embodiment, the integration processing unit 40 is accommodated in a housing separate from the camera unit.

The SOC/FPGA 41 includes an image processing unit 41a, a recognition unit 41b (second image recognition unit), and an integrated control unit 41c. The image processing unit 41a acquires respective RAW image signals from the camera processing units 31 to 34, and also acquires camera information of the camera units 11 to 14 from the camera information units 31c to 34c.

As described above, the camera information includes optical characteristics of the different angle-of-view lenses 21c and 23c and the reverse different angle-of-view lenses 22c and 24c, the number of pixels of the imaging elements 21d to 24d, photoelectric conversion characteristics, gamma characteristics, sensitivity characteristics, and format information of RAW image signals. The camera information includes mounting coordinates in vehicle coordinates, posture information, and the like of the camera units.

The image processing unit 41a performs resolution conversion on each of the RAW image signals from the camera processing units 31 to 34 based on the camera information, and also performs distortion correction on the image signals obtained from the respective low resolution regions 10b of the imaging units 21 to 24.

That is, distortion correction is performed on an image signal in a distortion correction region based on characteristics of an optical image, and a synthesized image is generated by synthesizing an image signal having been subjected to distortion correction and an image signal in a non-distortion correction region which has not been subjected to distortion correction.

That is, the image processing unit 41a also functions as a synthesizing unit (display signal generation unit), and performs a synthesizing step (display signal generation step) of generating a synthesized image by performing distortion correction and the like. In the first embodiment, the distortion correction region can be set by a user or automatically.

In the first embodiment, the image processing unit 41a does not perform distortion correction because the image signal obtained from the high resolution region 10a has almost no distortion. However, the image processing unit 41a may also perform simple distortion correction on the image signal obtained from the high resolution region 10a. Further, the image processing unit 41a appropriately performs irreversible compression processing and the like on each of the RAW image signals transmitted from the camera processing units 31 to 34.

Further, the image processing unit 41a synthesizes the distortion-corrected image signal of the low resolution region 10b of each of the imaging units 21 to 24 and the image signal of the high resolution region 10a so as to connect them smoothly to form entire images of the respective imaging units 21 to 24.

When distortion correction is performed on both the image signal of the low-resolution region 10b and the image signal obtained from the high resolution region 10a, distortion correction may be performed on the RAW image signals obtained by the image processing units 31a to 34a as they are.

The recognition unit 41b performs image recognition processing on each of the entire images of the respective imaging units 21 to 24 after at least the low resolution region has been subjected to distortion correction, and performs image recognition on a predetermined object (for example, an automobile, a person, an obstacle, or the like) in each of the entire images of the respective imaging units 21 to 24. That is, the recognition unit 41b performs distortion correction an image signal corresponding to at least the low resolution region (high distortion region) and then performs image recognition, and outputs a second image recognition result.

In this case, recognition results (the type and coordinates of the object) obtained by the recognition units 31b to 34b are also referred to. In the above description, the recognition unit 41b performs image recognition on each of the entire images of the respective imaging units 21 to 24, but may not necessarily perform image recognition on the entire image. For example, it is not necessary to perform image recognition on a peripheral portion of the image.

That is, the recognition unit 41b may include, for example, a region recognized by the recognition units 31b to 34b and recognizes a wider region.

Here, the recognition unit 41b functions as a second image recognition unit that performs image recognition on an image signal of a region wider than a partial region among image signals acquired by the image acquisition unit and outputs a second image recognition result, the region including the partial region having been subjected to image recognition by the first image recognition unit.

The second image recognition unit performs image recognition on a synthesized image obtained by synthesizing image signals corresponding to the high resolution region 10a as a low distortion region and the low resolution region 10b as a high distortion region, and outputs a second image recognition result.

In the first embodiment, the image processing unit 41a can form a panoramic synthesized image by synthesizing images from the camera units 12 to 14 as a plurality of imaging units so as to connect the images together.

In that case, the images of the plurality of imaging units which are to be connected together are set such that at least a portion of each of their respective imaging angles of view have an overlapping region by a predetermined amount or more. That is, the camera units 12 and 13 are disposed such that their imaging ranges overlap each other. Furthermore, the camera units 13 and 14 are disposed such that their imaging ranges overlap each other.

The recognition unit 41b performs image recognition on the panoramic synthesized image. In this manner, for example, it is possible to perform image recognition on an object imaged across the angles of views of the plurality of imaging units. That is, this is because, although the entire image of the object may not be known in individual entire images from the respective imaging units, substantially the entire object is shown in the panoramic synthesized image, and thus it may be possible to perform image recognition through image processing.

For example, when the recognition results obtained by the recognition units 31b to 34b and the recognition result obtained by the recognition unit 41b are different from each other, the integrated control unit 41c outputs an integrated image recognition result by adopting the recognition result with higher reliability.

Further, the integrated control unit 41c forms a signal for displaying a desired image among the entire images of the respective imaging units 21 to 24, the panoramic synthesized image, and the like on a first display unit 50, a second display unit 51, a third display unit 52, or the like. In this case, a frame for highlighting the recognized object, CG for information and warnings regarding the type, size, position, speed, and the like of the object, and the like are generated.

Further, CG of a boundary image for displaying a boundary is generated based on characteristic information of the optical system such as display resolution boundary information acquired from the camera information units 31c to 34c. Here, the first display unit 50, the second display unit 51, the third display unit 52, and the like function as display units that execute a display step of displaying image signals generated by the imaging units.

Display processing and the like for superimposing these CG and characters on an image are performed. Here, the first display unit 50, the second display unit 51, the third display unit 52, and the like function as display units and display image signals and integrated image recognition results.

The first display unit 50 is installed, for example, near the center of the front upper portion of the driver's seat of the vehicle 1 in the vehicle width direction with a display screen facing the rear of the vehicle, and functions as an electronic rear view mirror. The first display unit 50 may be configured to be usable as a mirror by using a half mirror or the like when it is not used as a display. Furthermore, the first display unit 50 includes a touch panel and operation buttons so as to be able to acquire a user's instructions and output them to the integrated control unit 41c.

The second display unit 51 is installed, for example, in the vicinity of an operation panel near the center in the vehicle width direction in front of the driver's seat of the vehicle 1. The vehicle 1 as a movable apparatus is equipped with a navigation system, an audio system, and the like which are not illustrated in the drawing.

For example, the second display unit can also display various control signals and the like obtained from the navigation system, the audio system, and the travel control unit (ECU) 60. Furthermore, the second display unit includes a touch panel and operation buttons so as to be able to acquire a user's instructions.

The second display unit 51 may be a display unit of a tablet terminal, for example, and can perform display by connecting to the integration processing unit 40 in a wired manner or can receive images through a communication unit 62 in a wireless manner and display the images.

The third display unit 52 is a display unit that functions as, for example, an electronic side-view mirror, and the right and left end portions of the first display unit 50 are used as the third display unit 52. However, the third display unit 52 may be provided separately from the first display unit 50.

In this case, the third display unit 52 is configured as a right electronic side-view mirror and a left electronic side-view mirror, the right electronic side-view mirror is disposed, for example, inside a right door, and a left electronic side-view mirror is disposed, for example, inside a left door.

In the first embodiment, it is assumed that the third display unit 52 is constantly set to be in a display state when the movable apparatus is powered on. Further, as a display angle of view on the third display unit 52, the entire imaging angle of view of each of the camera units 12 and 14 may be displayed.

As display panels for the first display unit 50, the second display unit 51, and the third display unit 52, a liquid crystal display, an organic EL display, or the like can be used. The number of display units is not limited to two.

The integrated control unit 41c communicates with the travel control unit (ECU) 60 and the like via a communication unit, which is not illustrated in the drawing, provided inside using a protocol such as CAN, FlexRay, or Ethernet. Thereby, display processing for appropriately changing information to be displayed is performed based on a vehicle control signal received from the travel control unit (ECU) 60 or the like. That is, for example, the range of an image to be displayed on the display unit, and the like are changed in accordance with a moving state of the vehicle acquired by the vehicle control signal.

The travel control unit (ECU) 60 is mounted on the vehicle 1 and is a unit in which a computer for comprehensively performing drive control, direction control, and the like of the vehicle 1, and a memory are built. As the vehicle control signal, information on the traveling of the vehicle (moving state) such as a travel speed, a travel direction, the states of a shift lever, a shift gear, and an indicator, and the orientation of the vehicle detected by a geomagnetic sensor or the like, and the like are input to the integration processing unit 40 from the travel control unit (ECU) 60.

On the other hand, the integrated control unit 41c transmits information such as the type, position, moving direction, and moving speed of a predetermined object (an obstacle or the like) which is recognized by the recognition units 31b to 34b and the recognition unit 41b to the travel control unit (ECU) 60. A configuration in which obstacles are detected by an obstacle detection unit 64 may be adopted.

When an obstacle is detected by the recognition units 31b to 34b, the recognition unit 41b, or the obstacle detection unit 64, the travel control unit (ECU) 60 performs control necessary for avoiding obstacles, such as stopping and driving of the vehicle and change of a travel direction. Here, the travel control unit (ECU) 60 functions as a moving control unit that controls the movement of the vehicle as a movable apparatus based on image recognition results and the like.

Some or all of the functional blocks included in the integration processing unit 40 and the like may be realized by hardware, or may be realized by causing the CPU 42 to execute a computer program stored in the memory 43. As the hardware, a dedicated circuit (ASIC), a processor (reconfigurable processor, DSP), or the like can be used.

A portion or all of the image processing performed by the image processing units 31a to 34a may be performed by the image processing unit 41a of the integration processing unit 40. That is, in the first embodiment, for example, the image acquisition unit and the first image recognition unit are accommodated in the housing of the same camera unit, and the camera unit and the second image recognition unit are accommodated in separate housings. However, for example, the first image recognition unit may be accommodated in the housing of the integration processing unit 40 together with the second image recognition unit.

In the first embodiment, the integration processing unit 40 is mounted on the vehicle 1 as a movable apparatus, but processing of some of the image processing unit 41a, the recognition unit 41b, and the integrated control unit 41c of the integration processing unit 40 may be performed by an external server or the like via a network, for example.

In this case, the imaging units 21 to 24 as image acquisition units are mounted on the vehicle 1 as a movable apparatus, but for example, some of the functions of the camera processing units 31 to 34 and the integration processing unit 40 can be processed by an external server or the like. Further, some or all of the functions of the integration processing unit 40 can also be provided to the travel control unit (ECU) 60.

Reference numeral 61 denotes a storage unit that stores the entire images of the respective imaging units 21 to 24 which are generated by the integration processing unit 40 and a panoramic synthesized image. Furthermore, CG such as a predetermined frame indicating a recognized object, characters, and warnings, and images having CG superimposed thereon and displayed on the first display unit 50, the second display unit 51, and the like are displayed together with the time, GPS information, and the like. The integration processing unit 40 can also reproduce past information stored in the storage unit 61 and display it on the first display unit 50 and the second display unit 51.

Reference numeral 62 denotes a communication unit for communicating with an external server or the like via a network, and the communication unit can transmit information before being stored in the storage unit 61 and past information stored in the storage unit 61 to the external server or the like and store them in the external server or the like.

As described above, an image can also be transmitted to an external tablet terminal or the like and displayed on the second display unit 51, which is a display unit of the tablet terminal. In addition, traffic information and various information can also be acquired from an external server or the like and displayed on the first display unit 50, the second display unit 51, and the third display unit 52 via the integration processing unit 40. In the first embodiment, these plurality of display units can simultaneously display images of respective angles of view.

Reference numeral 63 denotes an operation unit for inputting various instructions to the image processing system by a user's operation. The operation unit includes, for example, a touch panel, operation buttons, and the like. Reference numeral 64 denotes an obstacle detection unit for detecting an obstacle existing around the movable apparatus by using, for example, a laser beam.

In the first embodiment, the integrated control unit 41c can control image processing in the image processing units 31a, 32a, 33a, and 34a and perform exposure control (aperture control and accumulation time control) in the imaging units 21 to 24 through signal lines 71 to 74.

Figure 5:
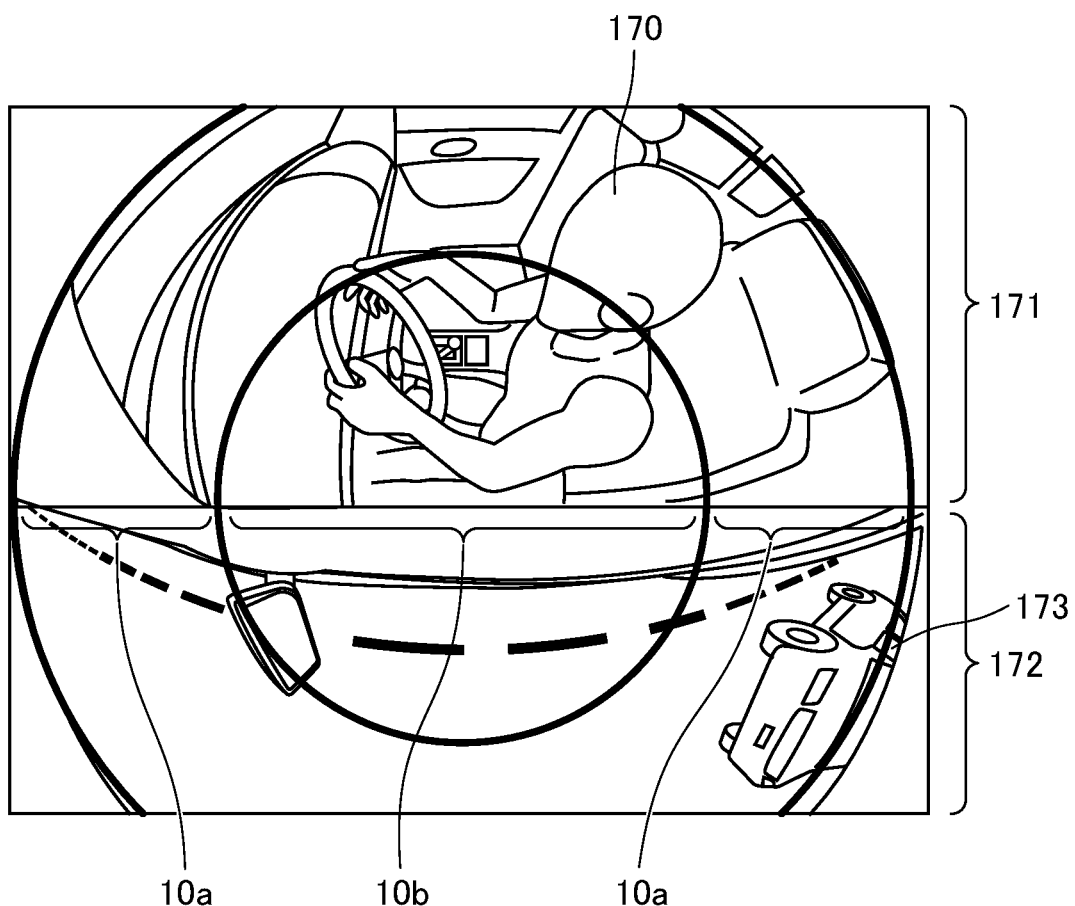
FIG. 5 is a diagram illustrating an example of an image captured by the camera unit 14 according to the first embodiment.

FIG. 5 is a diagram illustrating an example of an image captured by the camera unit 14 according to the first embodiment. As illustrated in FIG. 5, for example, when the driver's seat is on the left side, the camera unit 14 is disposed such that the face of a driver 170 is shown by an imaging angle of view 14a behind the camera unit 14, in which an image can be captured with high resolution and low distortion.

In FIG. 5, reference numeral 10a denotes a high resolution region, reference numeral 10b denotes a low resolution region, reference numeral 171 denotes the inside of the vehicle, reference numeral 172 denotes the outside of the vehicle on the left side of the vehicle 1, and reference numeral 173 denotes another vehicle positioned on an obliquely left rear side.

In the first embodiment, the camera unit 14 is disposed such that the face of the driver 170 is shown by the imaging angle of view 14a behind the camera unit 14, in which an image can be captured with high resolution and low distortion, and thus abnormalities and the like can be detected based on the orientation of the driver's face and the driver's line of sight.

That is, it is possible to detect an abnormal state such as the driver's face or line of sight facing obliquely downward due to illness or fatigue. Since it is possible to capture an image of the rear seats inside the vehicle, it is possible to prevent, for example, an accident in which the driver leaves the vehicle with an infant left in the vehicle.

Figure 6:
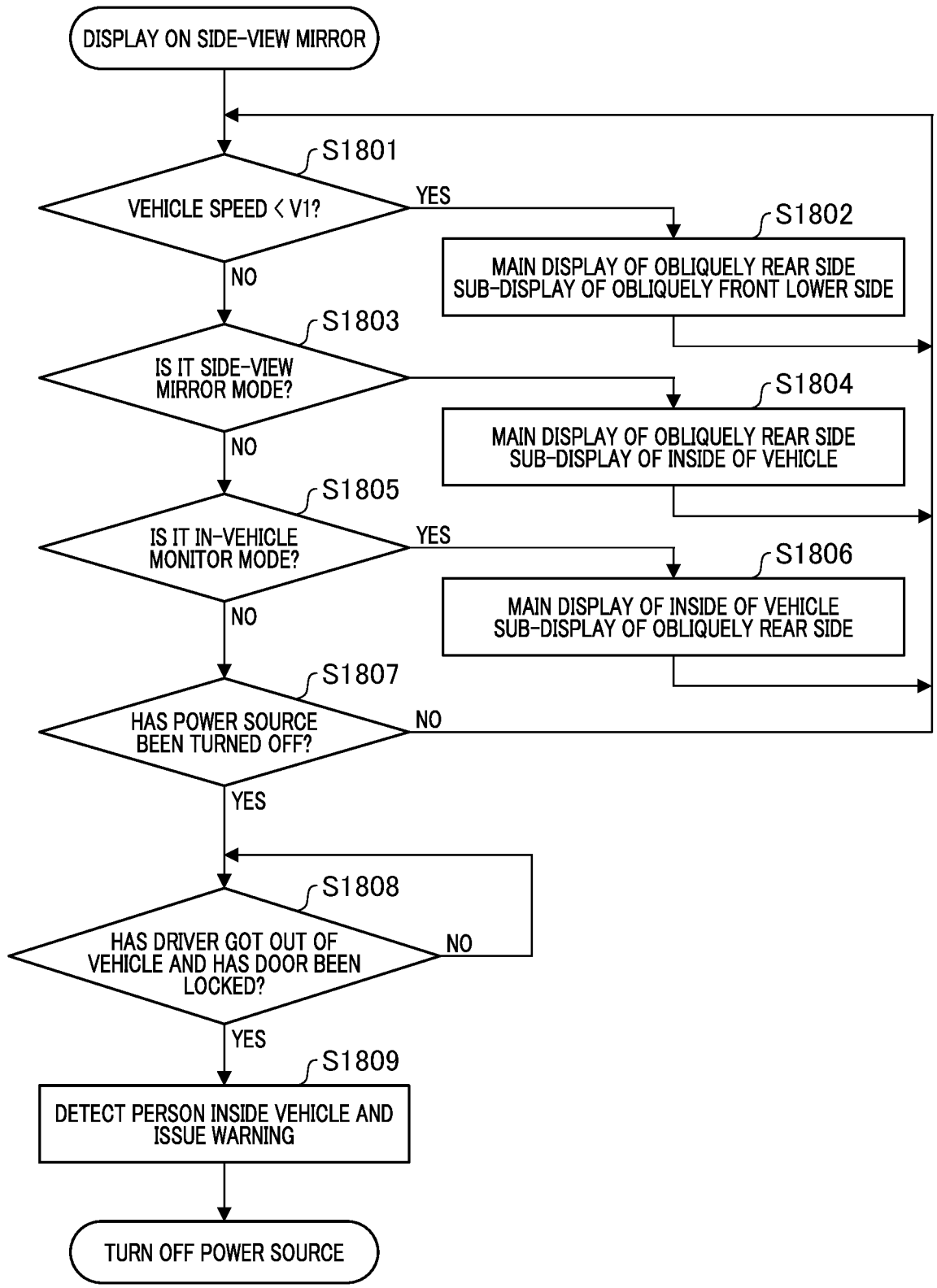
FIG. 6 is a flowchart illustrating an example of display processing according to the first embodiment.

FIG. 6 is a flowchart illustrating an example of display processing according to the first embodiment. A flow in FIG. 6 is processed, for example, in units of frames by causing the CPU 42 of the integration processing unit 40 to execute a computer program stored in the memory 43.

In step S1801 of FIG. 6, the CPU 42 determines whether a vehicle speed is lower than a predetermined low speed threshold value V1 (for example, 30 km/h) based on vehicle speed information received from the travel control ECU 60. In the case of Yes in step S1801, the processing proceeds to step S1802.

In step S1802, the CPU 42 cuts out predetermined rectangular region from images obtained by the imaging angles of view 12a and 14a obliquely behind the camera units 12 and 14 in which an image can be captured with high resolution and low distortion, and displays the region on the right and left electronic side-view mirrors as a main image.

Here, the right electronic side-view mirror and the left electronic side-view mirror may be integrated with the first display unit, for example, as illustrated in FIG. 14, or may be separately displayed on a left third display unit and a right third display unit.

In step S1802, the obliquely rear rectangular image is displayed as a main image, and an obliquely front lower image is displayed as a sub-image in a small size on a main screen in a picture-in-picture mode. Regarding the main image, as illustrated in FIG. 11, the image quality is optimized by performing image quality adjustment (exposure adjustment in the imaging unit and image quality adjustment in the image processing unit).

On the other hand, regarding the sub-image, for example, an average brightness level is optimized by further performing gain adjustment or the like on the main image having been subjected to the image quality adjustment. The exposure adjustment includes adjustment of the aperture of the optical system, accumulation time, and the like.

In this manner, when the vehicle speed is low, the obliquely front lower image is displayed as a sub-image, making it easier to find obstacles in a blind spot. In particular, when turning right or left at low speeds, accidents involving obstacles in blind spots can be prevented. After the display in step S1802 is performed, the processing returns to step S1801.

On the other hand, in the case of No in step S1801, the processing proceeds to step S1803, and it is determined whether a side-view mirror mode has been selected. The side-view mirror mode is a display mode that can be selected, for example, by the driver touching the screen of the electronic side-view mirror and selecting a menu.

When it is determined in step S1803 that the side-view mirror mode has been selected, the processing proceeds to step S1804. In step S1804, the CPU 42 displays the obliquely rear rectangular image on the electronic side-view mirror as a main image and displays an image of the inside of the vehicle on the main screen as a sub-screen in a small size in a picture-in-picture mode.

In this case, similarly to step S1802, regarding the main image, the image quality is optimized by performing image quality adjustment (exposure adjustment in the imaging unit and image quality adjustment in the image processing unit) as illustrated in FIG. 11. Regarding the sub-image, for example, an average brightness level is optimized by further performing gain adjustment or the like on the main image having been subjected to the image quality adjustment.

In particular, in step S1804, there is a large difference in brightness level between the main image and the sub-image, and the sub-image can also be displayed at a sufficient brightness level by performing gain adjustment on the sub-image in this manner.

In this state, for example, an abnormality of the driver may be detected by performing image recognition of the orientation of the driver's face or the driver's line of sight. When an abnormality has been detected, an accident can be prevented by notifying the user of the abnormality using a sound or an image. After the processing of step S1804 is performed, the processing returns to step S1801.

In the case of No in step S1803, the CPU 42 determines in step S1805 whether an in-vehicle monitor mode has been selected. The in-vehicle monitor mode is a display mode that can be selected, for example, by the driver touching the screen of the electronic side-view mirror and selecting a menu.

When it is determined in step S1805 that the in-vehicle monitor mode has been selected, the processing proceeds to step S1806, and the CPU 42 displays an image of the inside of the vehicle on the electronic side-view mirror as a main image. The CPU 42 displays an obliquely rear image on the main screen as a sub-screen in a small size in a picture-in-picture mode.

In this case, similarly to steps S1802 and S1804, regarding the main image, the image quality is optimized by performing image quality adjustment (exposure adjustment in the imaging unit and image quality adjustment in the image processing unit) as illustrated in FIG. 11. Regarding the sub-image, for example, an average brightness level is optimized by additionally performing gain adjustment or the like on the main image having been subjected to the image quality adjustment.

Also in step S1806, there is a large difference in brightness level between the main image and the sub-image, and the sub-image can also be displayed at a sufficient brightness level by performing gain adjustment on the sub-image in this manner.

In this state, for example, an abnormality of the driver may be detected by performing image recognition of the orientation of the driver's face or the driver's line of sight. When an abnormality has been detected, an accident can be prevented by notifying the user of the abnormality using a sound or an image. After the display processing in step S1806 is performed, the processing returns to step S1801.

In the case of No in step S1805, the processing proceeds to step S1807 to determine whether an accessory power source of the vehicle 1 is turned off, and in the case of No, the processing returns to step S1801. On the other hand, in the case of Yes in step S1807, the processing proceeds to step S1808, and the CPU 42 determines whether the driver has gone out of the vehicle and locked the door by performing image recognition of the image of the inside of the vehicle.

In the case of No, the processing returns to step S1808. In the case of Yes in step S1808, the processing proceeds to step S1809, and the CPU 42 detects a person based on the image of the inside of the vehicle and issues a warning using a sound or the like when a person is detected. After the warning is issued or when no person is detected, the warning is turned off and the power of the vehicle is turned off after a predetermined period of time has elapsed.

With the above-described flow, it is possible to prevent abnormalities in the vehicle during traveling and to prevent children from being left in the vehicle after the doors are locked.

Second Embodiment

Figure 7:
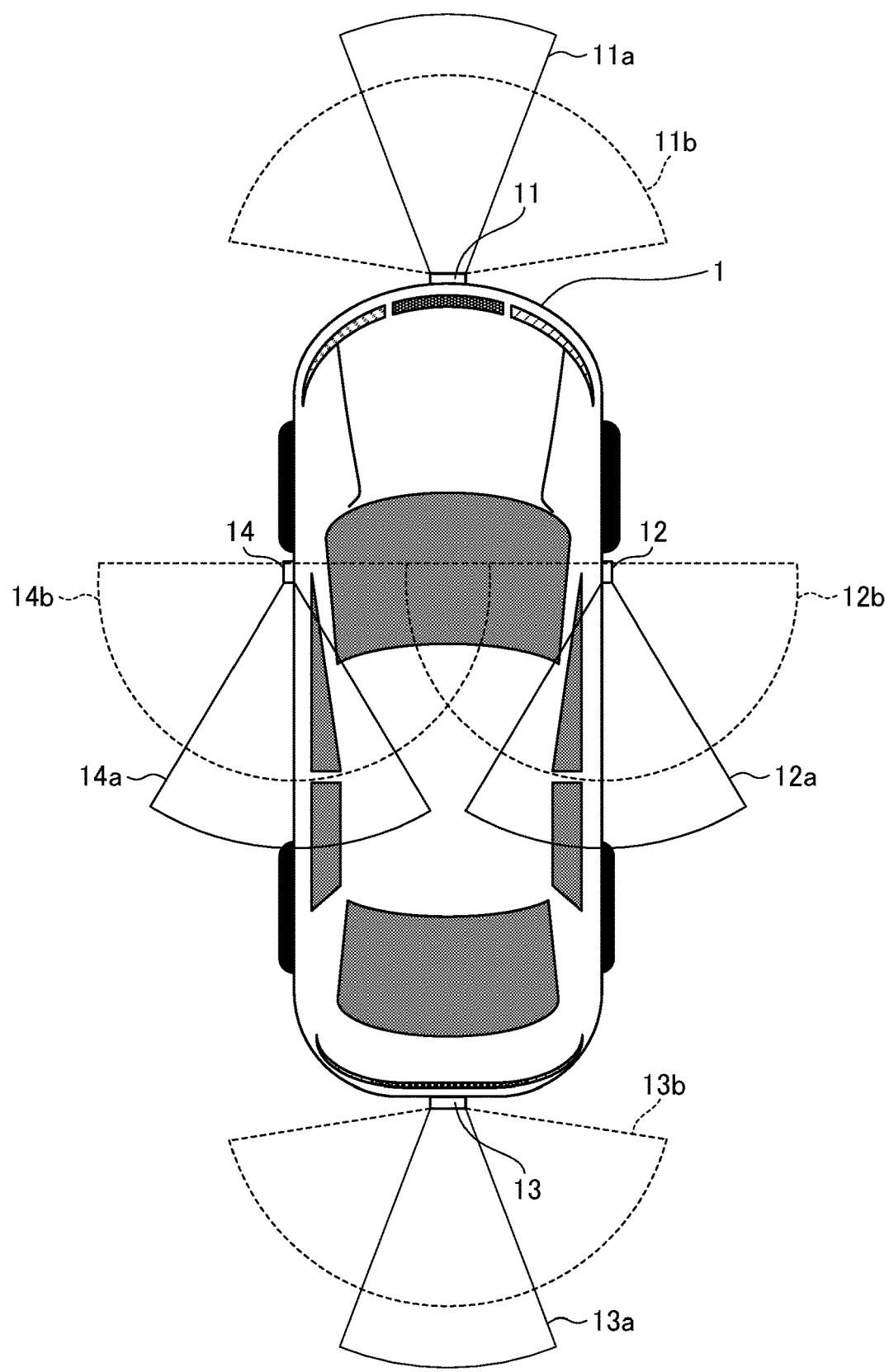
FIG. 7 is a diagram illustrating a configuration example of camera units 12, 14, and the like according to a second embodiment.

FIG. 7 is a diagram illustrating a configuration example of camera units 12 and 14, and the like according to a second embodiment. Optical systems of the camera units 12 and 14 in the second embodiment have the same imaging angles of view as optical systems of camera units 11 and 13.

In the second embodiment, the orientation of the camera units 12 and 14 (the direction of the optical axes of the optical systems) is substantially horizontal and faces toward the rear of a vehicle 1. That is, the optical axis of an optical system of an imaging unit is disposed toward the rear of a movable apparatus.

In the second embodiment, the optical systems of the camera units 12 and 14 are different angle-of-view lenses having the same characteristics as the optical systems of the camera units 11 and 13 (the characteristics illustrated in FIG. 3). That is, the optical systems are configured to be able to obtain high-definition images at angles of view around the optical axes and to obtain captured images with low resolution at the surrounding angles of view away from the optical axes.

In FIG. 7, reference numerals 12a and 14a denote imaging angles of view in which images can be captured with high resolution and low distortion, and reference numerals 12b and 14b denote maximum imaging ranges (imaging angles of view) of the camera units 12 and 14, respectively. As illustrated in FIG. 7, in the second embodiment, the imaging angles of view 12a and 14a of the camera units 12 and 14 in which images can be captured with high resolution and low distortion are respectively set such that images can be captured up to the rear seats in the vehicle.

In this manner, the camera units 12 and 14 according to the second embodiment are disposed on the outer sides of right and left doors, and each of the camera units 12 and 14 can capture images of an obliquely rear side, the lateral side, and the inside of the vehicle 1.

According to the camera units 12 and 14 according to the second embodiment, as compared to, for example, a fisheye lens, it is possible to capture an image of the vicinity of the center of the optical axis in an enlarged manner and to capture images of rear vehicles on the right and left sides and faces of a driver and passengers inside the vehicle in an enlarged manner. Thus, it is possible not only to make it easier to view the rear vehicles on the right and left sides, but also to confirm, for example, the line of sight of the driver's face, and thus it is possible to detect the driver's abnormalities, inattentive behavior, or the like and issue warnings and the like in a timely manner.

Figure 8:
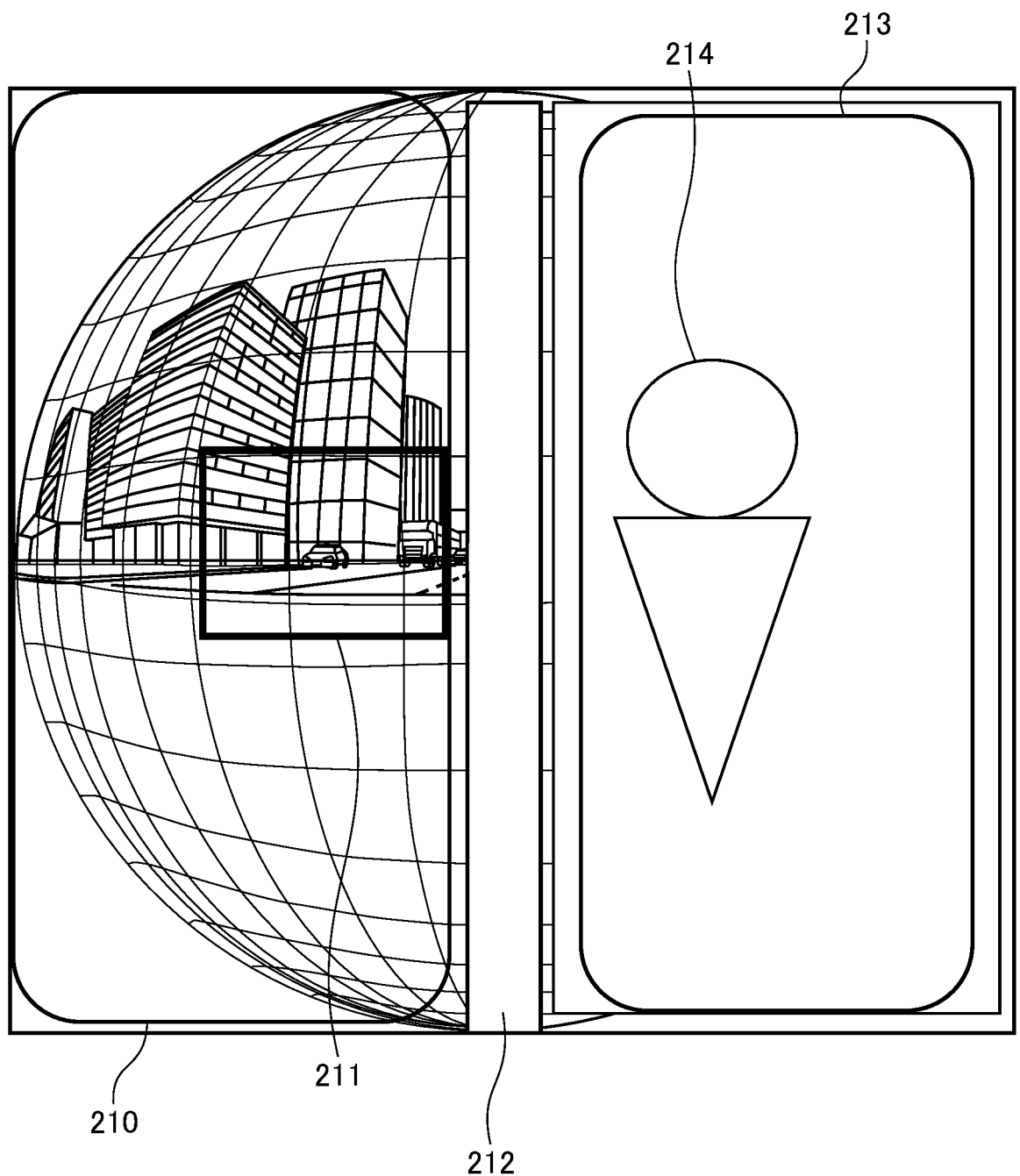
FIG. 8 is a diagram illustrating an example of an image captured by the camera unit 14 according to the second embodiment.

FIG. 8 is a diagram illustrating an example of an image captured by the camera unit 14 according to the second embodiment. In FIG. 8, reference numeral 210 denotes an image with an angle of view on the left side, and reference numeral 211 denotes a rectangular region in which a vehicle on the left rear side, and the like are shown. Reference numeral 212 schematically shows an image of a vehicle body, reference numeral 213 schematically shows an image of the inside of the vehicle, and reference numeral 214 schematically shows a driver.

For example, in step S1803 of FIG. 6, when it is determined that a side-view mirror mode is set, the image of the rectangular region 211 is displayed on the electronic side-view mirror as a main image, and the image 213 of the inside of the vehicle is displayed as a sub-image. In this case, as described above, when an abnormality or the like is detected by performing image recognition of the driver's face and line of sight in the image of the inside of the vehicle, a warning is issued.

Third Embodiment

Figure 9A:
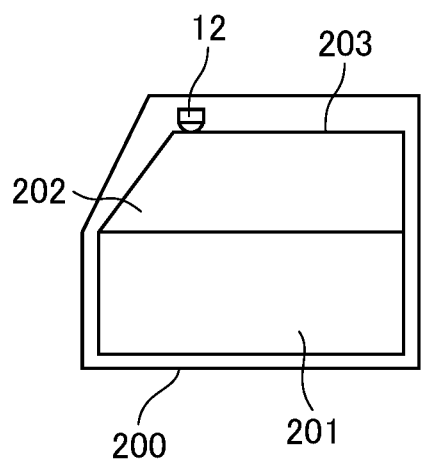
FIGS. 9A and 9B are diagrams illustrating configuration examples of camera units 12, 14, and the like according to a third embodiment.
Figure 9B:
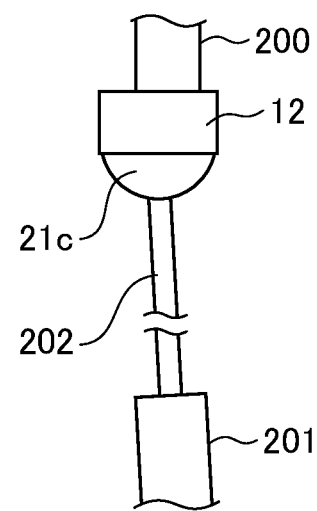

FIGS. 9A and 9B are diagrams illustrating a configuration example of a camera unit 12 according to a third embodiment, FIG. 9A is a diagram illustrating an example of the arrangement of the camera unit 12 with respect to a right door, and FIG. 9B is a diagram illustrating details of main parts.

Although a configuration example of the camera unit 12 will be described in FIGS. 9A and 9B, a configuration of a camera unit 14 may be the same as that of the camera unit 12 illustrated in FIGS. 9A and 9B.

Different angle-of-view lenses having the same characteristics as the optical systems of the camera units 12 and 14 in the first embodiment are used for the camera units 12 and 14 according to the third embodiment. Similarly to the first embodiment, the optical axis of the optical system is directed substantially perpendicularly downward with respect to the ground (horizontal plane).

In FIGS. 9A and 9B, reference numeral 200 denotes a door frame, reference numeral 201 denotes a door panel, reference numeral 202 denotes a window glass on the side of a movable apparatus, reference numeral 203 denotes a rubber frame, and reference numeral 21c denotes a different angle-of-view lens of the camera unit 12.

As illustrated in FIG. 9, the camera unit 12 is disposed in a notched portion of the rubber frame 203 of the door frame 200 or at the position of the rubber frame 203, and is disposed such that a tip portion of the different angle-of-view lens 21c abuts against the window glass 202. That is, the optical system of the imaging unit is disposed to be exposed to the outside and inside of the movable apparatus. With this arrangement, the outside and interior of the vehicle 1 can be clearly imaged.

For example, in the first embodiment, it may not be possible to capture a clear image of the inside of the vehicle due to reflections or dirt on the window glass. However, according to the third embodiment, such a problem can be solved. The same effects can be obtained with the camera unit 14.

As described above, according to the configurations of the first to third embodiments, it is possible to realize an image processing system that can simultaneously acquire and display high-quality images of the outside and inside of the movable apparatus using one imaging unit.

Although the camera units 12 and 14 are disposed outside the right and left doors in the second and third embodiments, they may be disposed inside the doors due to circumstances of an installation space, or the like as long as it is possible to capture images of the inside and outside of the vehicle.

Although a case where the camera units 12 and 14 are installed near the doors at the front of the vehicle has been described in the first to third embodiments, they may be installed at other locations. For example, they may be installed near doors at the rear seats.

An example in which the image processing system is mounted on the movable apparatus such as an automobile has been described in the above-described embodiments. However, the movable apparatuses in these embodiments are not limited to a vehicle such as an automobile, and any movable apparatus may be used as long as it is a moving device such as a train, a ship, an airplane, a robot, or a drone.

The image processing system of the embodiment may or may not be mounted on those movable apparatuses. The configurations of these embodiments can also be applied, for example, when a movable apparatus is remotely controlled.

Although the present invention has been described above in detail based on the preferred embodiments, the present invention is not limited to the above embodiments, and various modifications can be made based on the gist of the present invention, and these are not excluded from the scope of the invention. Although an example in which the camera units 11 to 14 are provided has been described in the above embodiments, for example, only the camera unit 12 or the camera unit 14 may be provided.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing system through a network or various storage media. Then, a computer (or a CPU, an MPU, or the like) of the image processing system may be configured to read and execute the program. In such a case, the program and the storage medium storing the program configure the present invention.

Further, the present invention includes, for example, those realized using at least one processor or circuit configured to function of the embodiments explained above. Note that distributed processing may be performed using a plurality of processors.

This application claims the benefit of Japanese Patent Application No. 2022-191271, filed on Nov. 30, 2022, which is hereby incorporated by reference herein in its entirety.

What is claimed is:

1. An image processing system comprising:
an imaging unit including an optical system that forms an optical image having a low distortion region and a high distortion region, the imaging unit being configured (1) to be able to capture an image of at least an outer rear side of a movable apparatus in the low distortion region, and (2) to be disposed such that an inside of the movable apparatus is included in an angle of view of the optical system; and
at least one processor or circuit configured to function as a unit configured to control display of image signals of the inside and outside of the movable apparatus which are generated by the imaging unit,
wherein, when a focal length of the optical system is f, a half angle of view is $\theta$, an image height on an image plane is y, and a projection characteristic representing a relationship between the image height y and the half angle of view $\theta$ is $y(\theta)$, $y(\theta)$ in the low distortion region is larger than $f \times \theta$ and is different from the projection characteristic in the high distortion region, and
wherein, when $\theta$ max is a maximum half angle of view of the optical system, and A is a predetermined constant, the following formula is satisfied:

$1 < f \times \sin\theta \max/y(\theta \max) \leq A.$

2. The image processing system according to claim 1, wherein the imaging unit includes an imaging element that captures the optical image.

3. The image processing system according to claim 1, further comprising a plurality of the imaging units disposed at different positions,
wherein the at least one processor or circuit is further configured to function as a display signal generation unit configured to synthesize the image signals acquired from the plurality of imaging units to generate a synthesized image.

4. The image processing system according to claim 1, wherein the low distortion region and the high distortion region correspond to a high resolution region and a low resolution region of the optical image, respectively.

5. The image processing system according to claim 1, wherein the low distortion region is configured to have a projection characteristic approximate to a central projection system ($y=f \times \tan\theta$) or an equidistant projection system ($y=f \times \theta$).

6. The image processing system according to claim 1, wherein an optical axis of the optical system of the imaging unit is disposed in a vertical direction when the movable apparatus is in a horizontal state.

7. The image processing system according to claim 1, wherein an optical axis of the optical system of the imaging unit is disposed to face a rear of the movable apparatus.

8. The image processing system according to claim 1, wherein the optical system of the imaging unit is disposed to be exposed to an outside and inside of the movable apparatus.

9. The image processing system according to claim 1, wherein the optical system comprises a lens.

10. The image processing system according to claim 1, wherein the movable apparatus is an automobile.

11. An image processing system comprising:
an imaging unit including an optical system that forms an optical image having a low distortion region and a high distortion region, the imaging unit being configured (1) to be able to capture an image of at least an outer rear side of a movable apparatus in the low distortion region, and (2) to be disposed such that an inside of the movable apparatus is included in an angle of view of the optical system; and
at least one processor or circuit configured to function as a unit configured to control display of image signals of the inside and outside of the movable apparatus which are generated by the imaging unit,
wherein, when a focal length of the optical system is f, a half angle of view is $\theta$, an image height on an image plane is y, and a projection characteristic representing a relationship between the image height y and the half angle of view $\theta$ is $y(\theta)$, $y(\theta)$ in the low distortion region is larger than $f \times \theta$ and is different from the projection characteristic in the high distortion region, and
wherein, when $\theta$ max is a maximum half angle of view of the optical system, the following formula is satisfied:

$0.2 < 2 \times f \times \tan(\theta \max/2)/y(\theta \max) < 0.92.$

12. An image processing system comprising:
an imaging unit including an optical system that forms an optical image having a low distortion region and a high distortion region, the imaging unit being configured (1) to be able to capture an image of at least an outer rear side of a movable apparatus in the low distortion region, and (2) to be disposed such that an inside of the movable apparatus is included in an angle of view of the optical system; and
at least one processor or circuit configured to function as a unit configured to control display of image signals of the inside and outside of the movable apparatus which are generated by the imaging unit,
wherein, when a focal length of the optical system is f, a half angle of view is $\theta$, an image height on an image plane is y, and a projection characteristic representing a relationship between the image height y and the half angle of view $\theta$ is $y(\theta)$, $y(\theta)$ in the low distortion region is larger than $f \times \theta$ and is different from the projection characteristic in the high distortion region, and
wherein, when max is a maximum half angle of view of the optical system, and A is a predetermined constant, an imaging unit including an optical system satisfying the following formula is disposed at least one of at a front and a rear of the movable apparatus:

$1 < f \times \sin\theta \max/y(\theta \max) \leq A.$

* * * * *